July 25, 1967  J. C. FAGAN  3,333,084
ELECTRIC IRON
Filed June 26, 1964  2 Sheets-Sheet 1
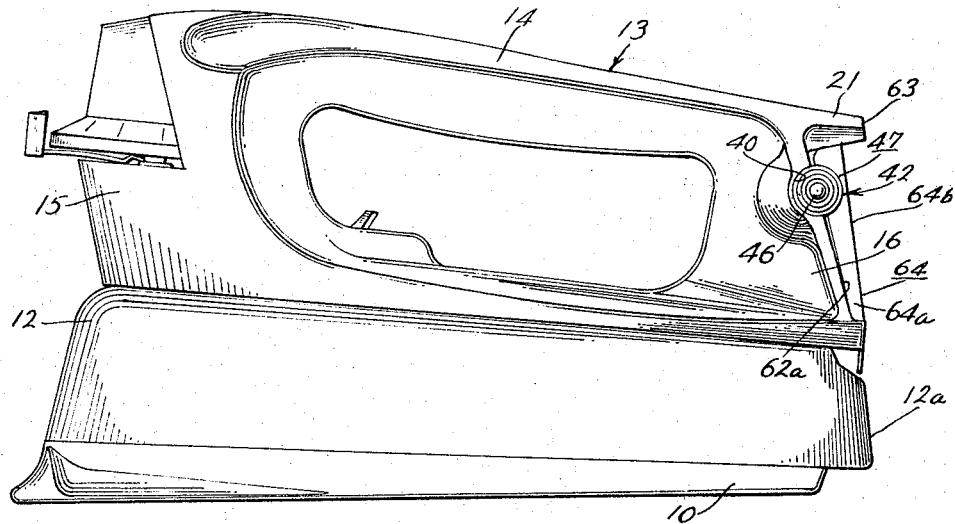
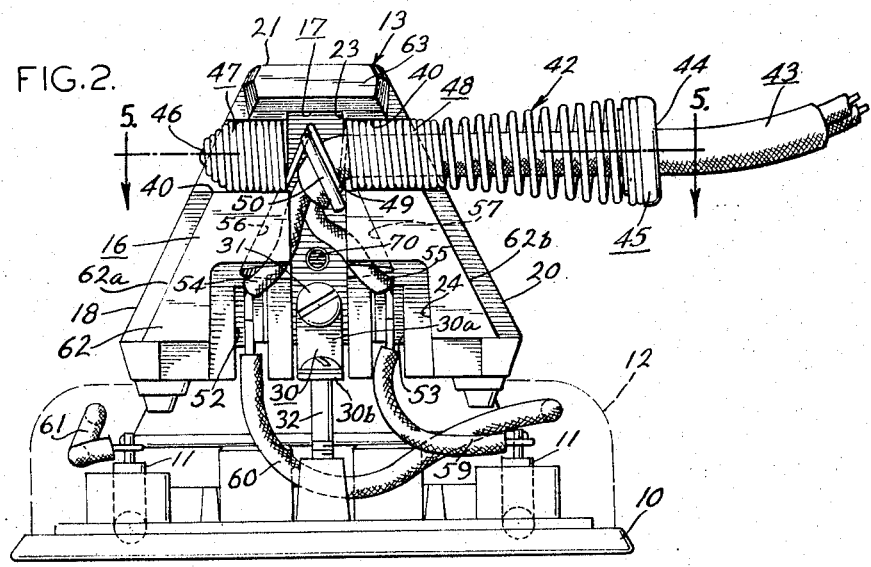
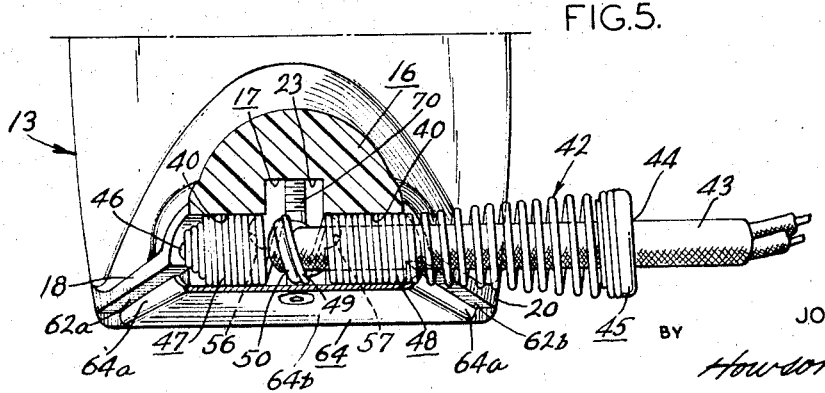
INVENTOR:
JOHN C. FAGAN
BY Howson & Howson
ATTYS.

July 25, 1967  J. C. FAGAN  3,333,084
ELECTRIC IRON
Filed June 26, 1964  2 Sheets-Sheet 2

INVENTOR:
JOHN C. FAGAN
BY Howson & Howson
ATTYS.

United States Patent Office 3,333,084
Patented July 25, 1967

3,333,084
ELECTRIC IRON
John C. Fagan, Philadelphia, Pa., assignor to The Proctor-Silex Corporation, Philadelphia, Pa., a corporation of Connecticut
Filed June 26, 1964, Ser. No. 378,276
12 Claims. (Cl. 219—256)

This invention relates to electric irons, and more particularly to means whereby the cord to supply electric current to the heating element may be selectively extended either to the right or the left of the iron to suit the requirements of the user of the iron.

In one widely used construction of electric irons, the handle includes a hollow rear leg having an aperture in its side wall through which the cord may be introduced. A similar aperture is provided in the opposite side wall, closed by a plug which may be removed to reverse the cord. For such reversal it is necessary to disconnect the wires from their terminals and to reconnect them after the cord is introduced from the opposite side. This is not a simple operation.

There have been a number of proposals to extend the cord through a pivotally mounted member that is rotatable through 180°, with or without a detent to retain the cord in its selected position. Such arrangements are usually costly. Other arrangements have been suggested, but they lack in some measurement the requirements of simplicity, economy or convenience.

It is the object of the present invention to provide a simple and inexpensive means for reversing the iron cord that avoids the difficulties encountered in the teachings of the prior art.

In accordance with this invention, the handle of the iron includes a hollow rear leg, with an arcuate recess extending horizontally across the back face of the rear leg for the reception of a coil-spring or moulded rubber guard for the cord. Only a portion of the guard surrounds the cord, which is arranged to project through the wall of the guard at a point intermediate its ends for connection of the wires to suitable terminals of the iron. The portion of the guard not containing the cord extends to the limit of the arcuate recess, having a closure at its end to provide a finished appearance. A plate is secured to the rear of the leg to retain the guard in the recess. Reversal of the cord to extend out the opposite side of the rear leg of the iron requires merely the removal of this plate after which the guard may be turned to the opposite position.

Permanent provision is made to transfer to the guard any tension on the cord, which is effective regardless of the orientation of the cord. In addition, the closure for one end of the guard serves as a closure for one end of the recess, thus obviating the need for a plug or similar device.

In the accompanying drawings:

FIGURE 1 is a side elevational view of an electric iron embodying the invention;

FIGURE 2 is a rear elevational view of the iron of FIGURE 1 with the cover plate at the rear leg removed to show one embodiment of the invention;

FIGURE 5 is a sectional view taken along line 5—5 of FIGURE 2; and

Figure 3:
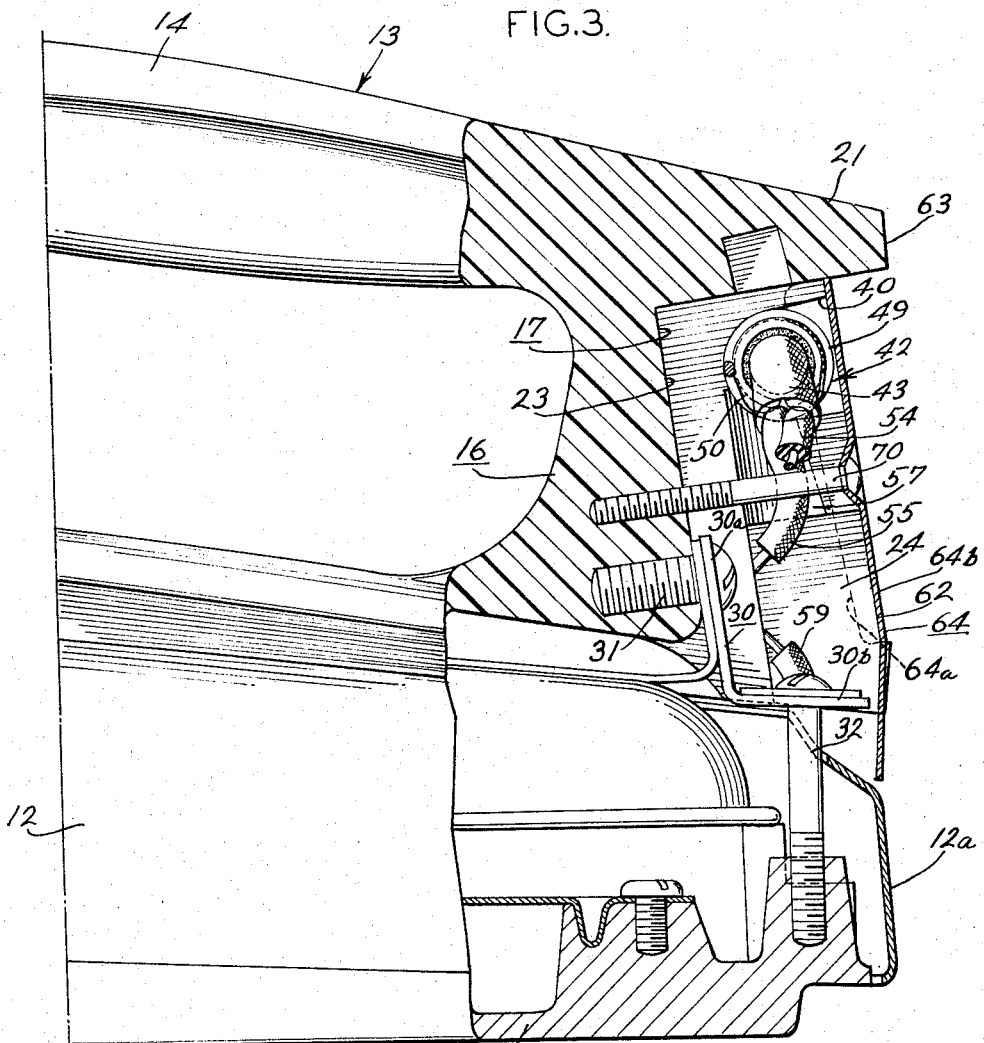
FIGURE 3 is a fragmentary side elevational view partially in section, of the rear portion of the iron.

Referring particularly to FIGURES 1 and 2, numeral 10 represents a soleplate having a heating element 11 embedded therein. Ordinarily the heating element is U-shaped with its bight adjacent the toe of the soleplate and its legs extending rearwardly adjacent the side edges of the soleplate. A sheet metal housing or shell 12 extends above the periphery of the soleplate, and is surmounted by a handle 13, commonly molded of resinous material. Handle 13 comprises a generally horizontally extending hand-grip portion 14, a front leg 15, and a rear leg 16.

As seen in FIGURES 2, 3 and 5, a cavity 17 is formed in the rear leg, opening at the rear and being located within side walls 18 and 20 and top portion 21. Cavity 17 comprises a tall and narrow recess 23 opening at the rear and extending inwardly and vertically from the bottom of the rear leg and a superimposed, shallower wide and short recess 24 opening at the rear and extending inwardly and vertically from the bottom of rear leg 16. A generally right-angled bracket 30 has one arm 30a located in the lower end of narrow recess 23, secured to leg 16 by means of screw 31. The other arm 30b is provided with an aperture through which screw 32 is inserted, the screw being further inserted through the opening in shell 12 and threaded into a boss in soleplate 10, thereby binding together soleplate 10, shell 12, and handle 13. Similar attachment means, not shown, is provided at the forward end of the iron.

A recess 40 having an arcuate bottom is formed in the rear of leg 16 adjacent the top thereof, extending horizontally across the full width of the leg, through the deeper, narrow recess 23 of cavity 17, and spaced above recess 24 of cavity 17. A coil-spring guard 42 is provided for electric cord 43, having an open end 44 equipped with a ferrule 45, in the usual manner through which the cord is extended, and having a closure 46 on the other end, the closure being formed preferably by coils of the guard of progressively diminishing diameter, as seen in FIGURES 2 and 5. Guard 42 has two close-wound portions 47 and 48, which are received into recess 40 adjacent side walls 18 and 20, respectively, and includes an open-wound portion between portions 47 and 48. Preferably the open-wound comprises a single coil 49, well spaced from the close-wound portions.

One end of cord 43 is drawn downward at coil 49 to the outside of guard 42. Adjacent the underside of coil 49 and between consecutive windings of the guard is a known-type of strain relief member 50 which comprises a U-shaped piece of metal having a phenolic lining arranged to surround and grip the cord tightly when the ends of the member are drawn together. The strain relief member transfers to the guard any tension on the cord exerted from outside the iron beyond the strain relief member.

Two inwardly extending recesses 52 and 53, shown in FIGURE 2, are formed in the bottom of recess 24 of cavity 17, one being located on each side of recess 23. The wires 54 and 55 of cord 43 are separated just below strain relief member 50 and extended through angular channels 56 and 57, extending outwardly and downwardly from sides of recess 23 at the level of recess 40 and into vertical recesses 52 and 53, respectively. Connectors in recesses 52 and 53 are provided to join these wires 54 and 55 to insulated conductors leading to the heating element. As shown in FIGURE 2, conductor 59 is connected to one end of heating element 11, conductor 60 is arranged for connection to one contact of a thermostatic control, not shown, and a similar conductor 61 connects the thermostatic control to the other end of heating element 11.

Figure 4:
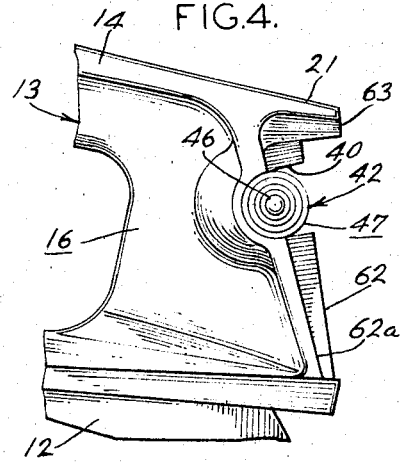
FIGURE 4 is a fragmentary side elevational view of the rear portion of the iron, with the cover plate removed.

As seen in FIGURES 2 and 4, the rear leg 16 has a rear face 62 with offset portions 62a and 62b on opposite sides of the rear face 62. The top portion 21 of the rear leg has a surface 63 which cooperates with the rear end 12a of shell 12 to support the iron in an upended rest position.

A plate 64, shown in FIGURES 1, 3 and 5, serves as a closure for cavity 17 and also serves as a means to retain guard 42 in arcuate recess 40. Plate 64 is preferably constructed of sheet metal having opposing similar side flanges 64a formed at 90° to the central closure web 64b, which gradually narrows at each side from bottom to top, and having horizontally aligned arcuate recesses in the edge of each side flange 64a, conforming to a portion of the periphery of guard 42. Plate 64 extends downwardly into proximity with the shell 12 to close the rear of the iron and may be bent inwardly near its bottom to better perform this function. The side flanges 64a of plate 64 extend into offset portions 62a and 62b which locates the plate horizontally, and thereby automatically provides proper vertical location. The plate is secured in position by screw 70 extending through an aperture in plate 64 and threaded into rear leg 16.

When it is desired to reverse cord 43 so that it extends in the opposite direction, screw 70 is removed, plate 64 is taken off, and guard 42 is lifted out of recess 40 and turned so that it may be replaced in recess 40 with opposite orientation, after which the plate is reinstalled. Regardless of its position, the iron has a finished appearance because of closure 46 which closes one end of recess 40.

Figure 6:
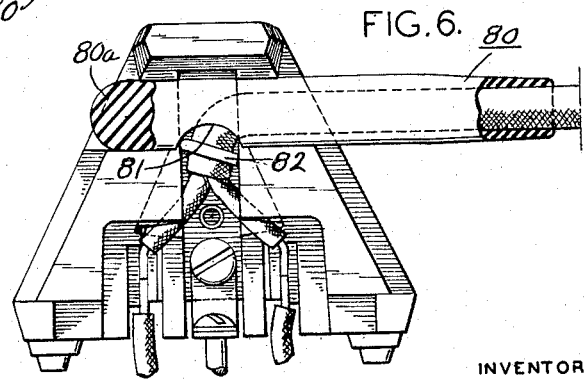
FIGURE 6 is a rear elevational view, partially in section, of another embodiment of the present invention, with the cover plate, shell and lower portion of the iron omitted.

The embodiment of FIGURE 6 is similar in all respects to that of FIGURE 2 except that guard 80 is constructed of moulded rubber, having an aperture 81 in its wall through which the cord extends into the rear leg. The end 80a of guard 80 is solid, and is provided preferably with a spherical termination. As in the first embodiment, a strain relief member 82 is arranged to transfer to the guard any tension on the cord.

Although only two embodiments have been described, other embodiments and modifications will be apparent to persons skilled in the art, and it is therefore to be understood that the invention is not to be limited in interpretation except by the scope of the following claims.

I claim:

1. An electric iron having a body portion provided with an electric resistance heating element, a handle for said iron having a rear leg with a cavity therein opening through a substantial portion of the rear of said rear leg, an electric cord comprising wires for supplying electric current to said heating element, an elongated guard for said cord including an end which is hollow through which said cord extends and an opening in said guard extending into said hollow through which said cord leaves said guard, a recess extending horizontally across the width of the rear of said rear leg receiving said guard and intersecting said cavity such that said cord extends into said cavity and said guard lies in said recess, means for connecting said wires to electrical conductors in said cavity for supplying current to said heating element, the connection between said wires and said conductors being accessible through the opening at the rear of said rear leg for disconnecting the wires from the conductors, a closure for the opening in the rear of said rear leg and for retaining said guard in said recess, said closure being non-reversible on said rear leg and releasable fastening means for coupling said closure to said rear leg such that said closure may be removed from said rear leg and said guard reversed in said recess to cause said cord to extend selectively to either side of said rear leg, said means for connecting said guard being separate elements from said closure.

2. An electric iron having a body portion provided with an electric resistance heating element, a handle for said iron having a rear leg with a cavity therein opening through the rear of said rear leg, an electric cord comprising wires for supplying electric current to said heating element, an elongated guard for said cord including an end which is hollow through which said cord extends and an opening in said guard extending into said hollow through which said cord leaves said guard, said guard having an extension beyond said opening, a recess extending horizontally across the width of the rear of said rear leg receiving said guard and intersecting said cavity such that when said cord extends into said cavity, the guard extends to each side thereof into said recess, means for connecting said wires to electrical conductors in said cavity for supplying current to said heating element, the connection between said wires and said conductors being accessible through the rear of said rear leg, a closure for the opening in the rear of said rear leg and for retaining said guard in said recess, and releasable fastening means for coupling said closure to said rear leg such that said closure may be removed from said rear leg and said guard reversed in said recess to cause said cord to extend selectively to either side of said rear leg.

3. An electric iron having a body portion provided with an electrical resistance heating element, a handle for said iron having a rear leg with a cavity therein, an electric cord comprising wires for supplying electric current to said heating element, an elongated guard for said cord including an end which is hollow through which said cord extends and an opening in said guard extending into said hollow through which said cord leaves said guard, said guard having an extension beyond said opening, a recess extending horizontally across the width of the rear of said rear leg receiving said guard and intersecting said cavity such that when said cord extends into said cavity, the guard extends to each side thereof into said recess, means for connecting said wires to said heating element, a removable plate connected to the rear of said rear leg to retain said guard in said recess and having a recess adapted to receive a portion of said guard, and means for coupling said plate to said rear leg.

4. An iron in accordance with claim 3, wherein said plate is constructed of sheet material having opposing sides formed at 90° to a central portion thereof, and having horizontally aligned recesses in edges of said sides of said plate adapted to receive said guard.

5. An electric iron having a body portion provided with an electric resistance heating element, a handle for said iron including a rear leg having a front wall and two side walls defining a cavity open at the rear of said rear leg, said side walls being provided with aligned horizontally disposed recesses extending across the width of the rear portions thereof, an electric cord comprising wires for supplying electric current to said heating element, an elongated guard for said cord arranged to extend across said cavity within said horizontally disposed recesses and having an opening in one end thereof through which the cord extends and an opening in a wall of said guard at a point intermediate the end portions thereof, through which said cord leaves said guard, means for connecting said wires to said heating element, a plate adapted to close the rear of said cavity having a recess arranged to receive a portion of said guard, and attachment means for releasably coupling said plate to said rear leg whereby said plate may be removed and the guard may be reversed to cause said cord to extend selectively to either side of said rear leg.

6. An iron in accordance with claim 5, wherein said wires are arranged in such manner that the guard may be reversed without disconnecting them from the heating element.

7. An iron in accordance with claim 5, including closure means for the end of said guard remote from the open end.

8. An iron in accordance with claim 5, wherein the connecting means between said wires and said heating element are within said cavity and are readily accessible when said plate is removed.

9. An electric iron having a body portion provided with an electric resistance heating element, a handle for said iron including a rear leg having a front wall and two side walls defining a cavity open at the rear of said rear leg, said side walls being provided with aligned horizontally disposed recesses extending across the width of the rear portions thereof, an electric cord comprising wires for supplying electric current to said heating element, a coil-spring guard for a portion of said cord arranged to extend across said cavity having close-wound portions to be received by said horizontally disposed recesses and an open-wound portion between said close-wound portions, said cord extending through one end of said guard and between the coils of the open-wound portion of said guard, means for connecting said wires to said heating element, a plate adapted to close the rear of said cavity having a recess conforming to a portion of said guard, and attachment means for releasably coupling said plate to said rear leg, whereby said plate may be removed and the guard may be reversed to cause said cord to extend selectively to either side of said rear leg.

10. An iron in accordance with claim 9, wherein closure means is provided for said guard at the opposite end from the one through which the cord extends and comprises a tapered end formed by coils of progressively diminishing diameter.

11. An electric iron having a body portion provided with an electric resistance heating element, a handle for said iron having a rear leg with a cavity therein opening through the rear of said rear leg, an electric cord comprising wires for supplying electric current to said heating element, an elongated guard for said cord including an end which is hollow through which said cord extends and an opening in said guard extending into said hollow through which said cord leaves said guard, a recess extending horizontally across the width of the rear of said rear leg receiving said guard and intersecting said cavity such that when said cord extends into said cavity, the guard extends into said recess to one side of said rear leg, means carried by said guard to extend to the other side of said rear leg in said recess to close the recess, means for connecting said wires to said heating element, a closure for retaining said guard in said recess, and releasable fastening means for coupling said closure to said rear leg such that said closure may be removed and said guard reversed to cause said cord to extend selectively to either side of said rear leg.

12. An electric iron having a body portion with an electric resistance heating element, a handle for said iron having a rear leg with a cavity therein opening through the rear of said rear leg, an electric cord comprising wires for supplying electrical current to said heating element, an elongated guard for said cord including an end which is hollow through which said cord extends into said guard and an opening in a side of said guard extending into said hollow through which said cord leaves said guard, said guard having an extension beyond said side opening, a recess extending horizontally across the width of the rear of said rear leg receiving said guard and intersecting said cavity such that when said cord extends into said cavity, said guard extends to each side thereof into said recess, means for connecting said wires to said heating element, a closure for retaining said guard in said recess, and releasable fastening means for coupling said closure to said rear leg such that said closure may be removed and said guard reversed to cause said cord to extend selectively to either side of said rear leg.

References Cited

UNITED STATES PATENTS

| | | | |
|---|---|---|---|
| 2,140,499 | 12/1938 | Duvall | 339—101 X |
| 2,247,826 | 7/1941 | Weeks | 219—256 |
| 2,286,487 | 6/1942 | Huffman | 219—256 |
| 2,416,984 | 3/1947 | Farr | 219—245 |
| 2,745,938 | 5/1956 | Brandler | 219—256 |
| 2,775,681 | 12/1956 | Kistner | 219—256 X |
| 3,104,482 | 9/1963 | Jepson | 219—252 X |

ANTHONY BARTIS, *Primary Examiner.*